US009172902B2

(12) United States Patent
Benzaia et al.

(10) Patent No.: US 9,172,902 B2
(45) Date of Patent: Oct. 27, 2015

(54) MEDIA RECORDER THAT SELECTS WHEN TO RECORD MEDIA CONTENT THAT IS AVAILABLE AT MULTIPLE TIMES

(75) Inventors: Thomas P. Benzaia, Sugarland, TX (US); Bernard S. Ku, Austin, TX (US); Lakshminarashimhan (Naras) Naidu, Pearland, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 36 days.

(21) Appl. No.: 13/452,082

(22) Filed: Apr. 20, 2012

(65) Prior Publication Data

US 2013/0279886 A1 Oct. 24, 2013

(51) Int. Cl.
*H04N 5/76* (2006.01)
*H04N 21/45* (2011.01)
*H04N 21/433* (2011.01)
*H04N 21/462* (2011.01)
*H04N 21/472* (2011.01)
*H04N 21/262* (2011.01)

(52) U.S. Cl.
CPC .............. *H04N 5/76* (2013.01); *H04N 21/2625* (2013.01); *H04N 21/4334* (2013.01); *H04N 21/4532* (2013.01); *H04N 21/462* (2013.01); *H04N 21/47214* (2013.01)

(58) Field of Classification Search
CPC .. H04N 5/76; H04N 21/4532; H04N 21/4334
USPC ......... 386/291, 292, 296–298, 259, 289, 293, 386/295; 725/133, 39, 44, 46, 58
See application file for complete search history.

(56) References Cited

U.S. PATENT DOCUMENTS

| | | | |
|---|---|---|---|
| 7,773,859 B1* | 8/2010 | Potrebic et al. | 386/291 |
| 7,949,627 B2 | 5/2011 | Aravamudan et al. | |
| 8,065,697 B2 | 11/2011 | Wright et al. | |
| 2002/0009285 A1* | 1/2002 | Safadi et al. | 386/46 |
| 2005/0216942 A1 | 9/2005 | Barton | |
| 2006/0078285 A1* | 4/2006 | Arishima | 386/46 |
| 2006/0222327 A1* | 10/2006 | Abe et al. | 386/83 |
| 2007/0172196 A1* | 7/2007 | Kusunoki et al. | 386/83 |
| 2008/0163306 A1* | 7/2008 | Sonoda | 725/58 |
| 2008/0235751 A1* | 9/2008 | Suzu | 725/133 |
| 2008/0256575 A1* | 10/2008 | Raju et al. | 725/39 |
| 2008/0267583 A1* | 10/2008 | Komori et al. | 386/83 |
| 2009/0019481 A1* | 1/2009 | White | 725/39 |
| 2010/0262998 A1* | 10/2010 | Yamamura | 725/58 |
| 2011/0004902 A1* | 1/2011 | Schultz et al. | 725/39 |
| 2011/0206342 A1 | 8/2011 | Thompson et al. | |
| 2011/0286719 A1* | 11/2011 | Woods | 386/293 |
| 2011/0311205 A1* | 12/2011 | McClanahan et al. | 386/296 |
| 2012/0011533 A1 | 1/2012 | Wright et al. | |

* cited by examiner

*Primary Examiner* — Thai Tran
*Assistant Examiner* — Mishawn Dunn
(74) *Attorney, Agent, or Firm* — Toler Law Group, PC (57) ABSTRACT

A particular method includes receiving program data designating media content to be recorded at a media recorder. An electronic program guide accessible to the media recorder includes multiple scheduled delivery times for the media content. The method includes receiving delay data. The delay data enables delayed recording of the media content and specifies at least one delay recording condition. The method includes determining an onset time to begin recording the media content based on the multiple scheduled delivery times for the media content and based on the at least one delay recording condition. The method also includes scheduling the media content to be recorded at the media recorder beginning at the onset time.

20 Claims, 4 Drawing Sheets

MEDIA RECORDER THAT SELECTS WHEN TO RECORD MEDIA CONTENT THAT IS AVAILABLE AT MULTIPLE TIMES

FIELD OF THE DISCLOSURE

The present disclosure is generally related to a media recorder that selects when to record media content that is available at multiple times.

BACKGROUND

Some television programming may be available to viewers at multiple times during a day or week. For example, an episode of a series, a sporting event, a movie, or another type of program may be available to viewers multiple times during a week. A media recorder may be used to schedule recording of media content at a time when the media content is available. At an initial recording setup, a user of the media recorder may select particular media content to be recorded and the media recorder will schedule recording of the media content. For media content that is an episode of a series, the user may elect to record new episodes of the series. When a new episode becomes available, the media recorder may automatically schedule recording of the new episode.

DETAILED DESCRIPTION

A media device (e.g., a set-top box device) may be able to concurrently process two or more input streams. For example, the media device may be able to receive a first programming stream from a content provider, process the first programming stream, and send the processed programming stream to a display device. The media device may also be able to concurrently receive a second programming stream from the content provider or from another source and use a media recorder to save the second programming stream to a memory. Other media devices may be able to concurrently process more than two streams. For example, a media device that is able to process three streams may be able to record a first media content stream, concurrently record a second media content stream, and concurrently send previously recorded media content to the display device.

When commands entered by a user of the media device reach or exceed stream processing capabilities of the media device, the media device may be unable to process streams as desired by the user. In some situations, the user may miss recording of certain media content. In other situations, the user may display on the display device a channel that is also being recorded by the media recorder without being able to change the channel.

To reduce a likelihood of reaching or exceeding the stream processing capability of the media device, the user may enable the media device to schedule recording of selected programs that are delivered multiple times during a period covered by an electronic program guide at times other than when the media device is most likely to be in use (e.g., at times other than during prime time viewing hours from 7:00 pm to 11:00 pm).

In a particular embodiment, a method includes receiving program data designating media content to be recorded at a media recorder. An electronic program guide accessible to the media recorder includes multiple scheduled delivery times for the media content. The method includes receiving delay data. The delay data enables delayed recording of the media content and specifies at least one delay recording condition. The method includes determining an onset time to begin recording the media content based on the multiple scheduled delivery times for the media content and based on the at least one delay recording condition when the delay data enables delayed recording of the media content. The method also includes scheduling the media content to be recorded at the media recorder beginning at the onset time.

In a particular embodiment, a media device includes a processor and a memory accessible to the processor. The memory includes instructions executable by the processor to receive program data designating media content to be recorded at a media recorder. An electronic program guide accessible to the media device includes multiple scheduled delivery times for the media content. The memory includes instructions executable by the processor to receive delay data. The delay data enables delayed recording of the media content and specifies at least one delay recording condition. The memory includes instructions executable by the processor to determine an onset time to begin recording the media content based on the multiple scheduled delivery times for the media content and based on the at least one delay recording condition when the delay data enables delayed recording of the media content. The memory also includes instructions executable by the processor to schedule the media content to be recorded at the media recorder beginning at the onset time.

In a particular embodiment, a non-transitory computer-readable medium includes instruction executable by a processor to receive program data designating media content to be recorded at a media recorder. An electronic program guide accessible to the media recorder includes multiple scheduled delivery times for the media content. The non-transitory computer-readable medium includes instruction executable by the processor to receive delay data. The delay data enables delayed recording of the media content and specifies at least one delay recording condition. The non-transitory computer-readable medium includes instruction executable by the processor to determine an onset time to begin recording the media content based on the multiple scheduled delivery times for the media content and based on the at least one delay recording condition when the delay data enables delayed recording of the media content. The non-transitory computer-readable medium also includes instruction executable by the processor to schedule the media content to be recorded at the media recorder beginning at the onset time.

Figure 1:
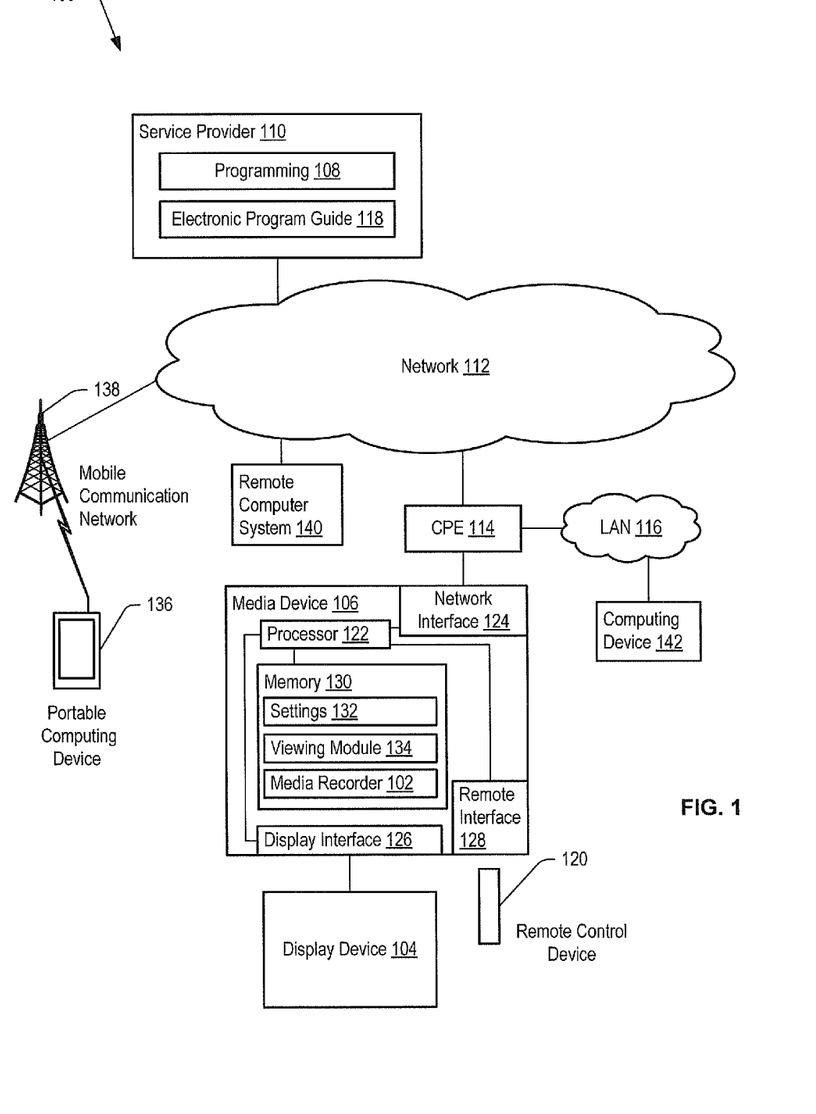
FIG. 1 is a block diagram of an embodiment of a system including a media recorder to select when to record media content that is available at multiple times.

FIG. 1 is a block diagram of a particular embodiment of a system 100 including a media recorder 102 to select when to record media content that is available at multiple times. The system 100 may include a display device 104 that presents media content to one or more viewers. The display device 104 may receive the media content from a media device 106. The media device 106 may be a set-top box device or another device able to send media content to the display device 104. The media device 106 may be an integral component of the display device 104 or a separate component. The media content may be programming 108 (e.g., television programming or pay per view programming) streamed by a service provider 110 or another entity to the media device 106 via a network 112 and customer premises equipment (CPE) 114. The CPE 114 may facilitate communications to and from the network 112 and a local area network (LAN) 116 established by the CPE 114. The CPE 114 may include a router, a wireless router, a local area network device, a modem (e.g., a digital subscriber line (DSL) modem or a cable modem), a residential gateway, another communication device, or combinations thereof. The media content may also be recorded media content sent to the display device 104 from the media recorder 102. The media recorder 102 may be an integral component of the media device 106 or a separate component coupled to the media device 106. The CPE 114 may also be an integral component of the media device 106 or a separate component coupled to the media device 106.

The service provider 110 or another entity may send an electronic program guide 118 to the media device 106. The electronic program guide 118 may include data descriptive of media content that is available to the media device 106 for a particular time period (e.g., a week). The data descriptive of the media content may indicate that particular media content is scheduled for delivery multiple times during the particular time period. The media device 106 may send an electronic program guide display to the display device 104 when the media device 106 receives a command to show an electronic program guide display. The command to show the electronic program guide display may be received when the display device 104 is turned on, when the media device 106 receives a request to tune to a channel associated with the electronic program guide, when the media device 106 receives a command to show the electronic program guide display as a result of actuation of a particular button or button combination of a remote control device 120 associated with the media device 106, at other times, or a combination thereof.

The media device 106 may include a processor 122. The processor 122 may be coupled to a network interface 124, a display interface 126, a remote interface 128, and a memory 130. The network interface 124 may enable the media device 106 to communicate via the network 112, via the LAN 116, or both. The display interface 126 may enable the media device 106 to send information to the display device 104. The remote interface 128 may enable the media device 106 to receive user commands from the remote control device 120, another input device, or both.

The memory 130 may store data, such as settings 132 for the media device 106, media content, and other information. The data may also include instructions executable by the processor 122 to perform tasks. For purposes of description, the instructions stored in the memory 130 of the media device 106 are illustrated in FIG. 1 as organized in functional modules. For example, the memory 130 may include a viewing module 134 that is operable to tune to a particular channel, to receive media content associated with the channel, to process the media content, and to send the processed media content to the display device 104.

The memory 130 may also include the media recorder 102 as a functional module of instructions executable by the processor 122. The media recorder 102 may be operable to record media content, to schedule recording of particular media content at a particular time for a particular time range, to facilitate playback of recorded media content to the display device 104 or another device, to perform tasks associated with management and control of recorded media content, and combinations thereof. The media content may include the programming 108 received from the service provider 110.

In other embodiments, the media recorder 102 is an external media recorder that is communicatively coupled to the media device 106. The external media recorder may include a processor and a memory accessible to the processor. The memory may store media content and may include instructions executable by the processor to implement media player functionality, such as instructions to implement the media recorder 102.

The media recorder 102 may generate a media recorder interface displayable on the display device 104 that enables a user to interact with the media recorder 102. One or more external devices may include media recorder interfaces that enable the external devices to access and control the media recorder 102. For example, a portable computing device 136 (e.g., a mobile communication device, a tablet computer, a personal digital assistant, a lap top computer, other type of communication device, or combinations thereof) that includes a media recorder interface may access the media recorder 102 via a mobile communication network 138 and the network 112 to schedule media recordings and to perform media content management. As another example, a remote computer system 140 (e.g., a computer at a work site of the user) may be used to access the media recorder 102 via the network 112 to schedule media recordings and to perform media content management. As another example, a computing device 142 (e.g., a mobile communication device, a tablet computer, a personal digital assistant, a desk top computer, a lap top computer, other type of communication device, or combinations thereof) that includes a media recorder interface may access the media recorder 102 via the LAN 116 to schedule media recording and to perform media content management. In some embodiments, the external devices may be able to receive media content from the media recorder 102 for playback.

When the user uses a device (e.g., the media device 106, the portable computing device 136, the remote computer system 140, or the computing device 142) to request recording of media content, the electronic program guide display may be sent to a display of the device. The electronic program guide display, or data for the electronic program guide display, may be obtained from the electronic program guide 118. The user may select media content to be recorded from a programming table of the electronic program guide display by selecting a particular entry (e.g., an episode of a series, a sporting event, a movie, etc.). The user may then enter a command to record the media content. The user may select media content to be recorded in an alternate manner. For example, the user may select media content from a listing of programs and enter commands to record the selected media content. The listing may be, but is not limited to, a recommendations list based on user preferences, viewing history, program popularity, other criteria, or combinations thereof; a listing based on user selected criteria (e.g., genre, popularity, program type, etc.); results of a search request based on user input; other listings of available media content, and combinations thereof. The user may request recording of more than one program via a single command. For example, the command may indicate that all new episodes of a series are to be recorded.

As an example of requesting the media recorder 102 to record media content, the user may use the remote control device 120 to send the electronic program guide display to the display device 104. The user may highlight a particular entry of the electronic program guide display. The user may actuate a button of the remote control device 120 to command the media recorder 102 to schedule recording of the media content associated with the particular entry. When the button is actuated, the media recorder 102 may determine whether the media content is an episode of a series. When the media content is an episode of a series, the user may be presented with options via the media recorder interface. The options may include an option to record only the selected episode and an option to record new episodes of the program. When the user selects the option to record new episodes of the series, the media recorder 102 may enter user configuration settings data into the settings 132 of the memory 130 that cause the media recorder 102 to schedule recording of new episodes of the series when such episodes become available.

When a command is received from the user, or periodically (e.g., daily or weekly), the media recorder 102 may determine whether media content to be recorded (e.g., media content identified in the command or in the settings 132) is available at multiple times by analyzing the electronic program guide 118. When the media content is not available at multiple times, the media recorder may automatically schedule the selected media content to be recorded by the media recorder 102 beginning at the time when the media content is scheduled to begin.

When the media content identified in a command is available at multiple times, the user may be presented with a delay option via the media recorder interface. User response, or non-response, to the delay option may be used to generate delay data. The delay option may be a selectable option to enable delayed recording of the media content. When the user does not select the delay option, the media recorder 102 may schedule the selected media content to be recorded by the media recorder 102 beginning at the time when the media content is scheduled to begin.

Figure 2:
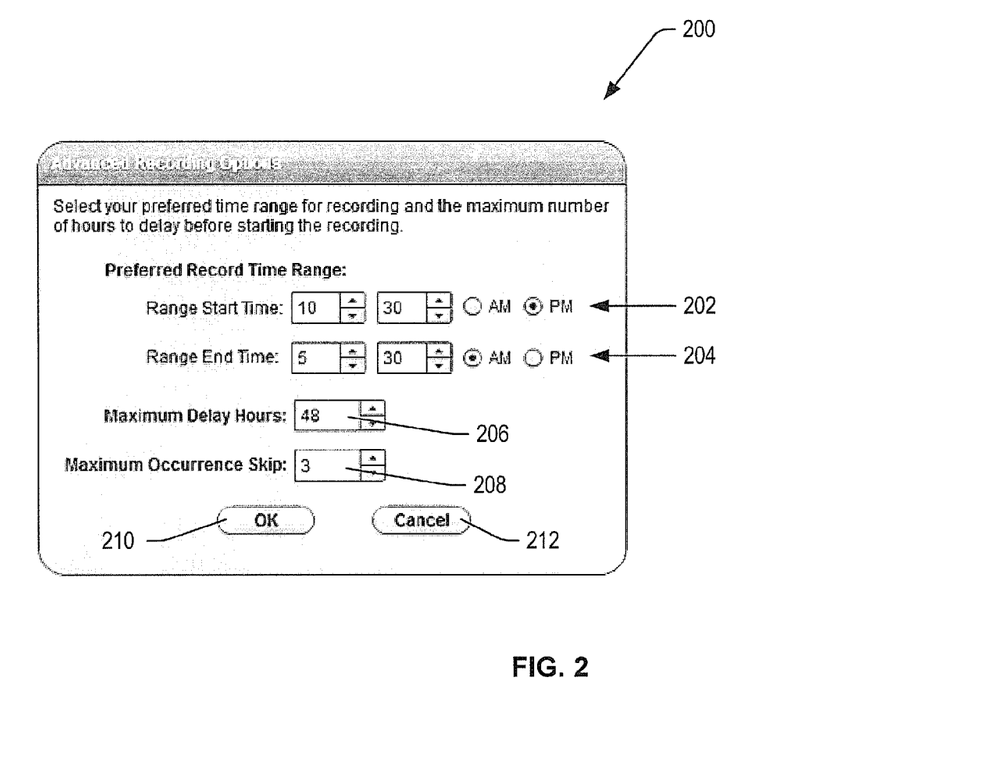
FIG. 2 is a representation of an embodiment of a media recorder interface that facilitates selection of a time to record media content that is available at multiple times.

When the user selects the option to enable delayed recording via the media recorder interface, the user may be presented with delay recording conditions. For example, when the user selects the option to enable delayed recording, the media recorder interface may send an Advanced Recording Options window to the display device 104. An embodiment of the Advanced Recording Options window is depicted in FIG. 2. The delay recording conditions may include a preferred recording time for the media content, a delay time period during which the media content should be recorded, a number of scheduled deliveries of the media content that can be skipped, other delay conditions, or a combination thereof. Accepted delay recording conditions may also be used to generate the delay data.

The delay data may be received by the media recorder 102 depicted in FIG. 1. When the media content is an episode of a series and the user chooses to record new episodes of the series, the delay data may be stored in the settings 132 of the memory 130. The media recorder 102 may access the delay data when a new episode of the series is detected in the electronic program guide 118 to determine when to schedule the media content to be recorded. When the delay data does not enable delayed recording of the media content, does not specify at least one delay recording condition, or both, the media recorder 102 may schedule the selected media content to be recorded by the media recorder 102 beginning at the time when the media content is scheduled to begin (e.g., at a first showing or instance of the media content in the electronic program guide). A time to begin recording the media content may be determined by the media recorder 102 based on the multiple scheduled delivery times for the media content and based on the at least one delay recording condition when the delay data enables delayed recording of the media content.

In an embodiment where the delay data enables delayed recording, includes a preferred time range to record the media content, includes a delay time during the media content should be recorded, and includes a number of scheduled deliveries of the media content that can be skipped, the media recorder 102 may determine a time to record the media content by scanning the electronic program guide 118 and making a list of upcoming scheduled deliveries of the media content. The list may be sorted in ascending order by scheduled delivery time and date. Starting at the earliest scheduled delivery, the media recorder 102 may truncate the list to a quantity equal to the number of scheduled deliveries of the media content that can be skipped plus one. The media recorder 102 may eliminate from the list any scheduled delivery where a time difference between the start of the scheduled delivery and the start time of the earliest scheduled delivery exceeds the delay time during which the media content should be recorded. With the remaining scheduled deliveries in the list, the media recorder 102 may search for the first delivery that falls within the preferred time range to record the media content. A recording may be scheduled for a first entry in the list that satisfies the preferred time range to record the media content. When no entry in the list satisfies the preferred time range to record the media content, a recording may be scheduled for the earliest scheduled delivery in the list.

In an embodiment, acceptance of the delay option may be selected as a default condition by the user for the media recorder 102. The user may select default delay recording conditions. The delay option and the default delay recording conditions may be stored in the settings 132 as delay data. When media content that does not have multiple delivery times is subsequently selected to be scheduled to be recorded, the delay data may be ignored. When media content that does have multiple delivery times is subsequently selected to be scheduled to be recorded, the user is presented with an option to unselect the delay option, with an option to change the default delay recording conditions, or both. When the user unselects the delay option, the media recorder 102 may be automatically scheduled to record the media content at the time selected by the user. When the user changes one or more default delay recording conditions, the changes are used to determine a time when recording of the media content is to begin. When the user does not unselect the delay option or change the default delay recording conditions, the default delay recording conditions may be used to determine a time when recording of the media content is to begin.

As an example of enabling delayed recording of media content, a user of the portable computing device 136 accesses the media recorder interface of the portable computing device 136 and selects to record Program A. Program A is an episode of a series that is delivered weekly on Tuesdays at 7:00 pm and the same episode is also repeated at 9:00 pm on Tuesday, 11:00 pm on Tuesday, and 1:00 am on Wednesday. The user intends to view the recorded episode of Program A within three days of the time the recorded episode is first available for delivery. The user realizes that Program B is usually recorded on Tuesday at 7:00 pm and that Program C is usually viewed on Tuesday beginning at 7:00 pm. Via the media recorder interface of the portable computing device 136, the user selects to record new episodes of the series and selects the user option to enable delayed recording of episodes of the Program A. Using the Advanced Recording Options window, the user selects a preferred recording time range from 10:30 pm to 5:00 am, a maximum delay time of 48 hours, and a maximum occurrence skip of 3. The media recorder 102 determines that recording of Program A on Tuesday of a first week at 11:00 pm satisfies the preferred recording time range, the maximum delay time, and the maximum occurrence skip and schedules recording of the available episode of Program A at 11:00 pm on Tuesday of the first week. Data that enables the media recorder 102 to record subsequent new episodes of Program A may be stored in the settings 132 of the media device 106.

If the media recorder 102 is not able to schedule the episode of Program A to be recorded at 11:00 pm on Tuesday of the first week (e.g., due to a scheduling conflict), the media recorder 102 would determine that the showing at 1:00 am on Wednesday of the first week also satisfies the maximum delay hours, and the maximum occurrence skip and would schedule the episode of Program A to be recorded at 1:00 am on Wednesday of the first week. If the media recorder 102 is not able to schedule the episode of Program A to be recorded at 1:00 am on Wednesday of the first week, the media recorder 102 may schedule the episode of Program A to be recorded at 7:00 pm on Tuesday, since no other time is available that satisfies the preferred recording time range, the maximum delay hours, and the maximum occurrence. If the media recorder 102 is not able to schedule the episode of Program A to be recorded at 7:00 pm on Tuesday of the first week, a notice may be provided to the user via the media recorder interface. The notice may inform the user that the episode of Program A cannot be recorded as desired. The notice may enable the user to manually change one or more scheduled recordings.

In a subsequent week, the Program A is shown only on Tuesday beginning at 7:00 pm and on Thursday beginning at 10:00 pm. When the media recorder 102 receives the electronic program guide 118 for the subsequent week, the media recorder 102 determines that recording of Program A at a delayed time would not be able to satisfy the preferred time range, the maximum delay time, and the maximum occurrence skip. The media recorder 102 schedules recording of Program A at 7:00 pm on Tuesday. If the media recorder 102 is not able to schedule the episode of Program A to be recorded at 7:00 pm on Tuesday (e.g., due to a scheduling conflict), a notice may be provided to the user via the media recorder interface. The notice may inform the user that the episode of Program A cannot be recorded as desired. The notice may enable the user to manually change one or more scheduled recordings.

As another example of enabling delayed recording of media content, a user of the media device 106 may use the remote control device 120 to schedule recording of Program D. Program D is a series that is available on Wednesday at 8:00 pm and subsequently at 11:00 pm on Thursdays and Fridays. Via the media recorder interface presented by the media recorder 102 to the display device 104, the user selects to record a single episode and chooses to enable delayed recording. Using the Advanced Recording Options window, the user selects a preferred recording time range from 10:30 pm to 5:00 am and a maximum delay hours of 24 hours. The media recorder 102 determines that recording of Program D at a delayed time would not be able to satisfy the preferred time range and the maximum delay hours, so the media recorder 102 would schedule the episode of Program D to be recorded at 8:00 pm on Wednesday.

If the media recorder 102 is not able to schedule the episode of Program D to be recorded at 8:00 pm on Wednesday, a notice may be provided to the user via the media recorder interface. The notice may inform the user that the episode of Program D cannot be recorded as desired (e.g., due to a scheduling conflict with another program that is to be recorded). The notice may enable the user to manually change one or more scheduled recordings.

Referring to FIG. 2, an embodiment of a user interface 200 representing an Advanced Recording Options window is shown. The Advanced Recording Options window may enable user entry of delay conditions to enable a media recorder (e.g., the media recorder 102 shown in FIG. 1) to select when to record media content that is available at multiple times. The user interface 200 may be displayed on a display device when a user selects to record media content that is available at multiple times, when the user selects to record media content, when the user selects an option from a media recorder interface to enable delayed recording of the media content, or at other times.

The user interface 200 may enable selection of one or more delay recording conditions. The delay recording conditions may include a preferred recording time for the media content. The user may enter a range start time via first clock fields 202. The first clock fields 202 may enable entry of an hour designation, a minute designation, and an AM/PM designation. The user may enter a range end time via second clock fields 204. The second clock fields 204 may enable entry of an hour designation, a minute designation, and an AM/PM designation. In some embodiments, the first clock fields 202 and the second clock fields 204 may initially display default entries that set the preferred recording time for non-prime viewing hours (e.g., from 11:00 pm to 6:00 pm of the next day) or user-defined default preferred recording times. In some embodiments, default values or user input for the user clock fields 202 and the user clock fields 204 may be null values so that a delayed recording time is not based on a preferred recording time.

The delay recording conditions may include a delay time period during which the media content should be recorded. The user may enter a number of delay hours in a delay field 206. In some embodiments, the delay field 206 may initially display a default entry (e.g., 48 hours). In some embodiments, a default value or user input for the delay field 206 may be null value so that a delayed recording time is not based on the delay time period.

The delay recording conditions may include a number of scheduled deliveries of the media content that can be skipped. The user may enter a number of scheduled deliveries that can be skipped in a skip field 208. In some embodiments, the skip field 208 may initially display a default entry (e.g., 5). In some embodiments, a default value or user input for the skip field 208 may be null value so that a delayed recording time is not based on a number of scheduled deliveries that can be skipped.

The user may accept one or more of the default values for delay recording conditions or change the values of the default values to modified delay recording conditions. For example, the user may change the delay field to 96 hours, change the skip field to 10, and leave the default value for the preferred recording time unchanged. The user interface 200 may include an accept button 210 that accepts the delay recording conditions. The user interface 200 may also include a cancel button 212 that removes the representation from the display device without accepting the delay conditions. Entry of up to three delay recording conditions may be allowed by the user interface 200 depicted in FIG. 2. In other embodiments of the user interface 200, less than three delay recording conditions, different delay recording conditions, more than three delay recording conditions, or combinations thereof may be allowed by the user interface 200.

Figure 3:
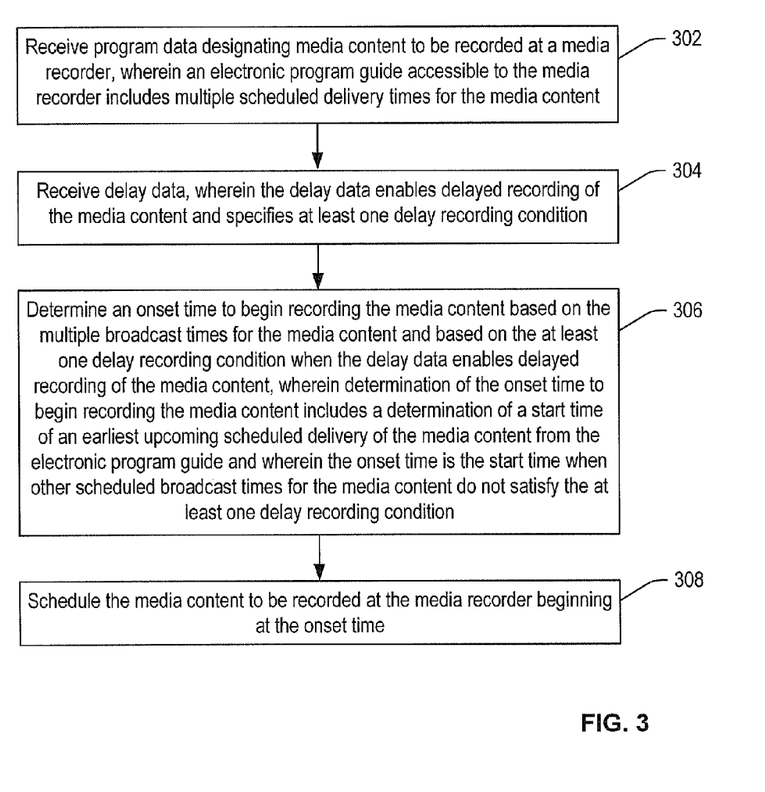
FIG. 3 is a flow chart of an embodiment of a method of selecting when to record media content that is available at multiple times.

Referring to FIG. 3, a flow chart of a particular embodiment of a method of selecting when to record media content that is available at multiple times. In an embodiment, the method may be performed by a media recorder that is a component of a media device (e.g., the media recorder 102 depicted in FIG. 1). In other embodiments, the method may be performed by a device that is connected to the media recorder by a network connection media recorder external to media device.

At 302, program data that designates media content to be recorded at the media recorder is received. Multiple scheduled delivery times for the media content may be included in an electronic program guide accessible to the media recorder. The program data may include a title of the media content, a time when the media content is scheduled to begin, a time when the media content is scheduled to end, a channel that will provide the media content, or a combination thereof. The program data may be received via user input that selects an occurrence of the media content in an electronic program guide display. The program data may be received via user input that selects the media content from a list of media content. The list may be a recommendations list based on user preferences, viewing history, program popularity, other criteria, or combinations thereof; a list based on user selected criteria; results of a search request based on user input; and other lists of available media content.

When the program data selecting the media content is received, a determination may be made whether the media content is an episode of a series. When the media content is an episode of a series, the user may be presented with options. The options may include an option to record only the selected episode and an option to record new episodes of the program. When the user selects the option to record new episodes of the series, the media recorder may schedule recording of new episodes of the series when such episodes become available.

After the program data selecting the media content is received, a determination may be made whether the program is available at multiple times by analyzing the electronic program guide. When the program is not available at multiple times, the media recorder may schedule the selected media content to be recorded by the media recorder beginning at the time when the media content is scheduled to begin.

When the media content is available at multiple times, the user may be presented with a delay option via a media recorder interface. Alternately, the user may be presented with the delay option, and delay recording conditions when the delay option is accepted, before a determination is made whether the media content is available at multiple times. User response or non-response to the delay option may be used to generate delay data. The delay option may include an option to enable delayed recording of the media content. When the user does not select the option, the media recorder may schedule the selected media content to be recorded by the media recorder beginning at a first showing or instance of the media content.

When the user selects the option to enable delayed recording, delay recording conditions may be presented via the media recorder interface. The delay recording conditions may include a preferred time range to record the media content. The delay recording conditions may include a delay time period during which the media content should be recorded. The delay recording conditions may include a number of scheduled deliveries of the media content that can be skipped. The user may enter values for one or more of the delay recording entries or accept default values of one or more of the delay recording conditions.

Delay recording conditions input by the user and accepted default delay recording conditions may be included in the delay data. The delay data may be received, at 304. In an embodiment, the delay data is received via the media recorder interface that is presented in response to receipt of user input selecting the occurrence of the media content in the electronic program guide. When the delay data does not enable delayed recording of the media content, does not specify at least one delay recording condition, or both, the media recorder may schedule the selected media content to be recorded by the media recorder beginning at a first showing or instance of the media content.

An onset time to begin recording the media content may be determined based on the multiple scheduled delivery times for the media content and based on the at least one delay recording condition when the delay data enables delayed recording of the media content, at 306. Determination of the onset time to begin recording the media content may include a determination of a start time of an earliest upcoming scheduled delivery of the media content from the electronic program guide. The onset time may be the start time when other scheduled broadcast times for the media content do not satisfy the at least one delay recording condition.

The media player may schedule the media content to be recorded at the media recorder beginning at the onset time, at 308. The media player may schedule to end recording the media content at an end of the scheduled delivery time for the media content. After the media content has been recorded, the user may select the media content from a listing of recorded media content to play the media content to a display device.

Various embodiments disclosed herein enable a user to elect to record media content that is deliverable at multiple times at a time that is based on one or more delay conditions selected by the user. When the user enables delayed recording of the media content, the recording of the media content may be moved to a time other than a first time that the media content is available without requiring manual intervention to move the recording time. Enabling delayed recording of the media content may enable the user to record the media content without worry about reaching or exceeding stream processing capabilities of the media device used to process incoming media content at the normal time that the media content is delivered. Enabling delayed recording of the media content may increase satisfaction with features available via the media recorder Referring to FIG. 4, an illustrative embodiment of a general computer system is shown and is designated 400. The computer system 400 may include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system 400 may include or be included within any one or more of the media device 106, the service provider 110, the CPE 114, the portable computing device 136, the remote computer system 140, or the computing device described with reference to FIG. 1.

Figure 4:
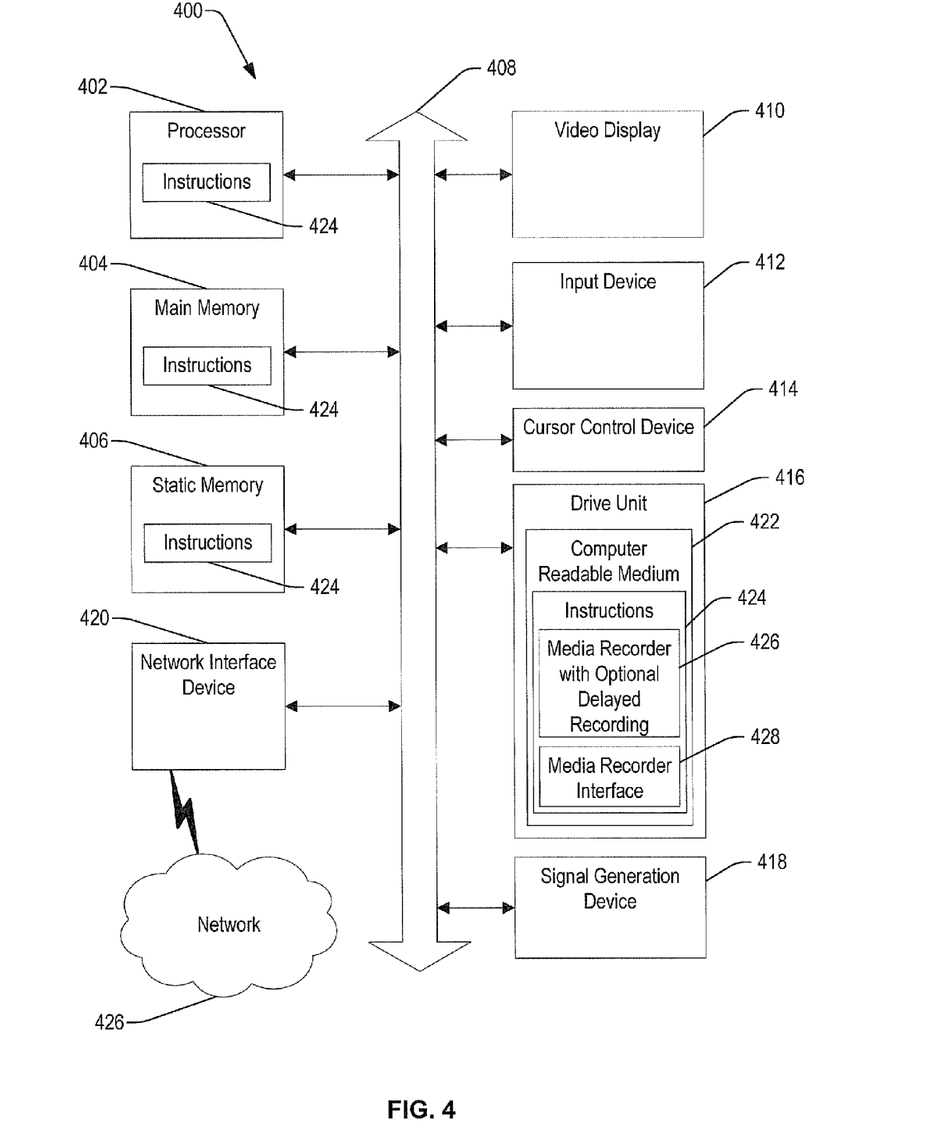
FIG. 4 is a block diagram of an illustrative embodiment of a general computer system.

In a networked deployment, the computer system 400 may operate in the capacity of a server or as a client user computer in a server-client user network environment, or as a peer computer system in a peer-to-peer (or distributed) network environment. The computer system 400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 400 may be implemented using electronic devices that provide video, audio, or data communication. Further, while a single computer system 400 is illustrated, the term "system"

shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 may include a main memory 404 and a static memory 406, which can communicate with each other via a bus 408. As shown, the computer system 400 may further include a video display unit 410, such as a liquid crystal display (LCD), a flat panel display, a solid state display, or a lamp assembly of a projection system. Additionally, the computer system 400 may include an input device 412, such as a keyboard, and a cursor control device 414, such as a mouse. The computer system 400 may also include a drive unit 416, a signal generation device 418, such as a speaker or remote control, and a network interface device 420. Some computer systems 400 may not include an input device (e.g., a server may not include an input device).

In a particular embodiment, as depicted in FIG. 4, the drive unit 416 may include a computer-readable non-transitory storage medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable non-transitory storage media. The instructions 424 in the drive unit 416, the main memory 404, the static memory 406, the processor 402, or combinations thereof may include a media recorder with optional delayed recording 426. The instructions 424 in the drive unit 416, the main memory 404, the static memory 406, the processor 402, or combinations thereof may include a media recorder interface 428 that generates one or more user interfaces for communication with a media recorder, enables input of data associated with the media recorder, or both.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a non-transitory computer-readable non-transitory storage medium 422 that stores instructions 424 or receives, stores and executes instructions 424, so that a device connected to a network 426 may communicate voice, video or data over the network 426. While the non-transitory computer-readable storage medium is shown to be a single medium, the term "non-transitory computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the non-transitory computer-readable storage medium may include a solid-state memory such as a memory card or other package that houses one or more non-volatile read-only memories. Further, the non-transitory computer-readable storage medium may be a random access memory or other volatile re-writable memory. Additionally, the non-transitory computer-readable storage medium may include a magneto-optical or optical medium, such as a disk or tapes or other storage device. Accordingly, the disclosure is considered to include any one or more of a non-transitory computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the turn "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising: receiving program data designating a particular media content item to be recorded at a media recorder, wherein an electronic program guide accessible to the media recorder includes multiple scheduled delivery times for the particular media content item; receiving delay data at the media recorder, wherein the delay data enables delayed recording of the particular media content item, specifies a delay time period during which the media recorder is to initiate recording of the particular media content item beginning at a particular scheduled delivery time of the multiple scheduled delivery times, specifies a range start time and a range end time, and specifies a number of scheduled deliveries that can be skipped; generating a set of upcoming scheduled delivery times, wherein a number of scheduled delivery times in the set includes up to one more than the number of scheduled deliveries that can be skipped; selecting, from the set with the media recorder, the particular scheduled delivery time to begin recording the particular media content item that satisfies the delay time period when the delay data enables delayed recording of the particular media content item, wherein the particular scheduled delivery time is the range start time, the range end time, or a time between the range start time and the range end time; and scheduling, with the media recorder, the particular media content item to be recorded at the particular scheduled delivery time by the media recorder.

2. The method of claim 1, wherein the delay data is received via user input responsive to a media recorder interface.

3. The method of claim 1, wherein the delay data comprises a default delay recording condition.

4. The method of claim 1, wherein selecting the particular scheduled delivery time includes determining an earliest scheduled delivery time of the particular media content item based on the electronic program guide.

5. The method of claim 1, wherein the particular media content item is an episode of a series or a movie, and wherein the program data specifies recording of new episodes of the series when the new episodes become available.

6. The method of claim 1, wherein the delay data is received from user configuration settings data stored at a memory.

7. The method of claim 6, wherein the delay data comprises a user defined default delay recording condition and further comprising receiving a modified delay recording condition via user input responsive to a configuration screen.

8. The method of claim 1, wherein the program data is received via a user input selecting an occurrence of the particular media content item in an electronic program guide display and wherein the delay data is received via second user input responsive to a media recorder interface presented after receiving the user input selecting the occurrence of the particular media content item in the electronic program guide display.

9. The method of claim 1, further comprising receiving a portion of the delay data via user input responsive to a user interface, wherein the user interface includes a clock field to enable a user to input the range start time.

10. The method of claim 1, further comprising:
sending a selectable option to enable delayed recording of the particular media item to a display device;
receive first user input indicating selection of the selectable option; and
sending a user interface to the display device to facilitate receipt of second user input related to the delay data.

11. The method of claim 1, further comprising receiving a portion of the delay data via user input responsive to a user interface, wherein the user interface includes a clock field to enable a user to input the range end time.

12. A media device comprising: a processor; and a memory accessible to the processor, wherein the memory includes instructions executable by the processor to perform operations comprising: receiving program data designating a particular media content item to be recorded at a media recorder, wherein an electronic program guide accessible to the media recorder includes multiple scheduled delivery times for the particular media content item; receiving delay data, wherein the delay data enables delayed recording of the particular media content item, specifies a delay time during which recording of the particular media content item is to be initiated, specifies a range start time and a range end time, and specifies a number of scheduled deliveries that can be skipped; generating a set of upcoming scheduled delivery times, wherein a number of scheduled delivery times in the set includes up to one more than the number of scheduled deliveries that can be skipped; selecting, from the set, a particular scheduled delivery time of the multiple scheduled delivery times to begin recording the particular media content item that satisfies the delay time when the delay data enables delayed recording of the particular media content item, wherein the particular scheduled delivery time is the range start time, the range end time, or a time between the range start time and the range end time; and scheduling the particular media content item to be recorded at the media recorder beginning at the particular scheduled delivery time.

13. The media device of claim 12, wherein the delay data is received via user input responsive to a media recorder interface.

14. The media device of claim 12, wherein the delay data includes a default delay recording condition.

15. The media device of claim 12, wherein the operations further comprise sending a notification that the particular media content item cannot be recorded as desired to a display device coupled to the media recorder when the particular scheduled delivery time cannot be selected based on the delay data.

16. A computer-readable storage device comprising instructions executable by a processor to perform operations comprising: receiving program data designating a particular media content item to be recorded at a media recorder, wherein an electronic program guide accessible to the media recorder includes multiple scheduled delivery times for the particular media content item; receiving delay data, wherein the delay data enables delayed recording of the particular media content item, specifies a delay time during which recording of the particular media content item is to be initiated, specifies a range start time and a range end time, and specifies a number of scheduled deliveries that can be skipped; generating a set of upcoming scheduled delivery times, wherein a number of scheduled delivery times in the set includes up to one more than the number of scheduled deliveries that can be skipped; selecting, from the set, a particular scheduled delivery time of the multiple scheduled delivery times to begin recording the particular media content item that satisfies the delay time when the delay data enables delayed recording of the particular media content item, wherein the particular scheduled delivery time is the range start time, the range end time, or a time between the range start time and the range end time; and scheduling the particular media content item to be recorded at the media recorder beginning at the particular scheduled delivery time.

17. The computer-readable device of claim 16, wherein the delay data is received via user input responsive to a media recorder interface.

18. The computer-readable storage device of claim 16, wherein the delay data comprises a default delay recording condition.

19. The computer-readable storage device of claim 16, wherein selecting the particular scheduled delivery time comprises determining an earliest scheduled delivery time of the particular media content item based on the electronic program guide.

20. The computer-readable storage device of claim 16, wherein the operations further comprise sending a user interface to a display device to facilitate receiving user input related to the delay data.

* * * * *